May 13, 1941.  M. R. SCOTT  2,241,618
BLOWPIPE TIP
Filed July 12, 1939
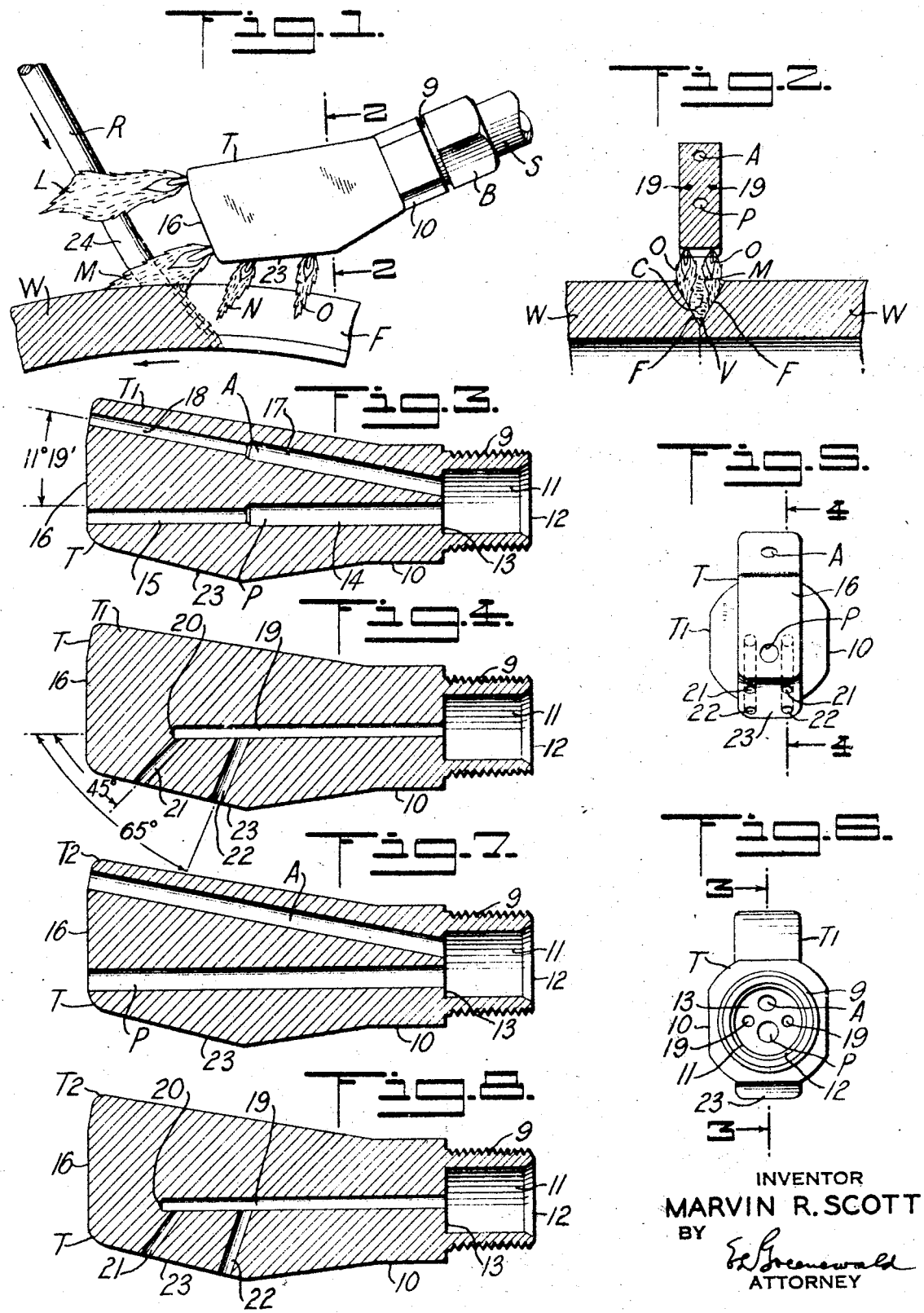
INVENTOR
MARVIN R. SCOTT
BY
ATTORNEY Patented May 13, 1941

2,241,618

UNITED STATES PATENT OFFICE 2,241,618

BLOWPIPE TIP

Marvin R. Scott, Cleveland, Ohio, assignor to Oxweld Acetylene Company, a corporation of West Virginia Application July 12, 1939, Serial No. 283,949

7 Claims. (Cl. 158—27.4)

This invention relates to blowpipe tips and more particularly to multi-flame tips for the carburizing flame roll welding of ferrous metal parts arranged to form a circumferential welding groove, such as a V.

In manually welding horizontal pipe, a rolling weld or joint generally is made wherever the pipe can be rolled or turned as it is welded, because this allows the work to be done constantly in the most convenient position. The pipe lengths first are beveled at their ends and axially aligned end to end to provide a circumferential welding V, and then they are tack-welded together. In the back-hand welding technique the weld sometimes is started at the top of the pipe and carried down the side until it reaches a point about 70° below the top center line of the pipe. The pipe is then turned or rolled until this point is at the top and the weld is continued down the side. This sequence of welding and turning is repeated until the joint is completed; the blowpipe being held so that the carburizing flame points in a direction opposite to the direction of welding, so that as the welding progresses the welding flame points backward over the completed portion of the weld. Also, where possible, the pipe is turned at a uniform rate while the welding operation is performed in a relatively fixed position near the top of the pipe.

In the past, such rolling welds were made preferably with a three-flame tip, which, in addition to the main welding flame, had two smaller auxiliary flames positioned so as to preheat the surfaces of the V directly ahead of the point of welding. Compared with single carburizing flame welding, great savings in welding time, rod metal, and gases were effected by such three-flame tip in roll welding ferrous metal pipe. However, these and other advantages recently have been offset by improved competitive methods of welding, especially those involving intermediate pipe sizes of 8 inch to 16 inch diameters where the electric welding of overland pipe lines has made progress. Therefore, a very definite need exists for improved efficiency in the commercial application of back-hand carburizing flame welding to rotated pipe joints where a liner or chill ring is not used.

The main objects of this invention, therefore, are to satisfy such need and to provide: a multi-flame welding tip which effects an increase of speed and a reduction of gas consumption even over that of the three-flame tip in the back-hand welding of rotating pipe joints of, for example, from ¼ inch to ⅜ inch wall in thickness and over 6 inches in diameter; means for producing a better weld than has been possible heretofore in making rolling welds; an improved multi-flame gas welding tip that is simple and economical in construction and very efficient and effective in use; and a multi-flame welding tip so designed that a jet discharged thereby may be enlarged for a specific application without otherwise affecting the action of the tip.

The speed of flame welding rotated pipe joints is limited in the ultimate by the rate at which the molten metal of the puddle of weld metal can solidify, which in turn is affected somewhat by the pipe diameter. Obviously, large diameter pipe can be welded at a greater lineal rate of speed than small diameter pipe, since the molten puddle remains in relatively the same position until solidification has taken place. However, it is impossible at present, and perhaps undesirable, to weld pipe at the maximum speed obtainable, because field conditions do not consistently satisfy perfect welding requirements. Variables, such as pipe line-up, grade of pipe, bevel, dexterity of the operator, may largely determine the maximum speed of welding for any given pipe line.

These variables influence advancement in welding progress by requiring any new process to conform to accepted standards or create entirely new ones. Accepted standards tend only to limit the scope of a new process, while creating new ones involves long and expensive training of field personnel.

Considerable experimental work has been made in accordance with this invention in an effort to improve the known commercial three-flame tip without altering to any major extent the practices heretofore habitually followed in pipe line work. A survey of field conditions reveals that any new equipment for pipe line welding should not only replace the three-flame tip, without need of special instruction to operators, but should provide a decrease of at least 30 per cent in time per joint as well as a reduction in gas consumption per joint. The welding tip of this invention is adaptable to all field conditions and serves as a replacement for the commerical three-flame tip. At the same time, the welding tip of this invention effects an average increase of speed of approximately 50 per cent and a reduction of gas consumption over that obtainable with such three-flame tip.

Referring to the drawing:

Fig. 1 is a view in side elevation of a tip embodying features of this invention, the tip being shown in use;

Fig. 2 is a view in section taken on line 2—2 of Fig. 1;

Fig. 3 is a longitudinal central sectional view of the tip taken on line 3—3 of Fig. 6;

Fig. 4 is a longitudinal sectional view taken on line 4—4 of Fig. 5;

Figs. 5 and 6, respectively, are front and rear elevational views of the tip; and Figs. 7 and 8 are views similar to Figs. 3 and 6, respectively, of a modified tip also embodying features of this invention.

In the past, most pipe lines were laid with relatively thick or heavy walled pipe to secure the necessary strength. At present, high strength welding rods are being used to weld higher strength thin walled pipe. The wall thickness is seldom greater than 1/4 inch or 3/8 inch, and those interested in laying pipe lines probably will take advantage of the progress that has been made in pipe fabrication by specifying thin walled pipe of high strength. In all probability few lines will be laid in the future in which the pipe wall thickness exceeds 1/8 inch. For these reasons, the present invention provides one basic tip T1, Figs. 3 to 6, for welding thin walled pipe up to a certain wall thickness; such tip T1 being readily modified or converted into a tip T2, Figs. 7 and 8, for welding thick walled pipe over a certain thickness. Thus, the basic readily modifiable tips may be manufactured and sold in quantity to satisfy the major need for welding pipe having a wall thickness up to 1/8 inch; but, if desired, such tips easily may be so changed that they are capable of efficiently welding pipe having a greater wall thickness.

In the development of the invention it was found most efficient to incorporate five preheating flames in each tip to provide the necessary preheat for the welding rod and the work. These, together with one central main welding flame for operating in the V, make a total of six flames per tip. The tip is made in such a novel manner that any flame may be enlarged for a specific application without destroying the action of the tip as a whole. However, tip T1 preferably is applicable to flame welding pipe having a wall thickness of from 1/4 inch to 3/32 inch, inclusive, and pipe diameters in excess of 6 inches; while tip T2 preferably is applicable to wall thicknesses of from 1/8 inch to 3/8 inch, inclusive.

The multi-flame tip T in general comprises a one-piece body of solid metal, such as copper, which is adapted readily to be attached to the tubular stem S of a standard conventional blowpipe wherein fuel gas and a combustion-supporting gas, such as acetylene and oxygen, are mixed and delivered to the tip by way of such stem S. The detachable connection between the stem S and tip T preferably comprises a nut B swiveled to the stem S for engagement with a threaded rear portion 9 of the tip T; the adjacent portion 10 of the body of the tip being substantially squared to fit a wrench. The exposed surface of the tip T preferably is chromium plated.

The tip T is provided with a relatively short central cylindrical gas inlet chamber 11 extending from the rear end 12 of the body and terminating in a flat bottom surface 13. Extending forwardly of the tip from said bottom surface 13 to the front end face 16 of the tip T is an elongated primary gas outlet passage P preferably comprising, in the tip T1, a large inlet bore 14 and a small outlet bore 15; the longitudinal axes of the passage P being disposed in substantially spaced parallel relation to the longitudinal axis of the chamber 11. Also extending from the bottom of the chamber 11 to the front end face 16 of the tip T is an elongated auxiliary gas outlet passage A having, in the tip T1, a large inlet bore 17 and a small outlet bore 18. The longitudinal axis of the passage A is disposed substantially in the central longitudinal-vertical plane of the tip, in which plane preferably lie the axes of the chamber 11 and passage P; the passage A diverging from the passage P at a relatively small angle of about 11° 19', with the passage A preferably being only slightly smaller in diameter than the passage P.

A pair of coplanar parallel secondary gas inlet passages 19, 19 extend forwardly from the bottom surface 13 of the chamber 11 in substantially equally spaced parallel relation to opposite sides of the central longitudinal-vertical plane of the tip T and terminate at 20 within the body of the tip in spaced relation to the front end face 16. The longitudinal axes of the passages 19 preferably are disposed in the central longitudinal-transverse plane of the tip. Extending downwardly and forwardly from the passages 19, 19 to the bottom face 23 of the tip are two spaced pairs of substantially parallel coplanar gas outlet passages 21, 21 and 22, 22, respectively. The pair of passages 21, 21 are inclined at an included angle of about 45° to the longitudinal axes of the passages 19, 19; while the pair of passages 22, 22 are inclined at an included angle of about 65° with said axes; the entrances of the outlet passages 21 and 22 being substantially spaced from each other along their respective inlet passage 19.

With this arrangement, the tip T is adapted to discharge simultaneously six flames, to wit: a main welding flame M from the primary gas outlet passage P; a rod preheating flame L from the auxiliary gas outlet passage A; and two spaced pairs of work preheating flames N, N and O, O, respectively, from the gas outlet passages 21, 21 and 22, 22.

The tip T1 may be modified or converted readily into the tip T2 merely by continuing the large inlet bores 14 and 17, respectively, of the passages P and A, to the front end face 16 of the tip, so that such passages are each of constant large diameter throughout their length, as shown by Fig. 7; and, if desired, by enlarging the diameter of the pair of gas outlet passages 22, 22 as shown by Fig. 8. With these slight changes the tip T1, which is applicable efficiently to weld work up to a certain thickness, may be converted to the tip T2, which is applicable efficiently to weld work of greater thickness, without any substantial alteration in the welding technique.

The ferrous metal pipe parts W, W are provided with beveled end surfaces F, F which are arranged to form a circumferential groove, such as a V V, the plane of the joint being substantially vertical. The pipe parts W, W are then tack-welded at spaced points so that they may be rolled or rotated together as the welding progresses, the four flames N, N and O, O preheating the surfaces F, F of the V V, the auxiliary flame L preheating a welding rod R, and the main flame M doing the actual welding. The tip T in general is constructed, as pointed out above, for most efficiently welding pipe of diameters above 6 inches, the tip T1 being best adapted for welding pipe wall thicknesses from 1/4 inch through 3/32 inch, and the tip T2 being best adapted for welding pipe wall thicknesses from $\frac{1}{16}$ inch through $\frac{3}{8}$ inch.

Since all welding on a rotated pipe joint is performed substantially in the same position, the rod and tip manipulation need not be adapted to changing conditions. In addition, the speed at which the rotated pipe joint can be welded, particularly on smaller diameters, is dependent on the time required for the puddle C to solidify, since solidification must occur before the puddle has passed beyond a substantially horizontal position. The welding operator preferably holds the rod R in one hand and the blowpipe carrying the tip T in the other hand, as shown by Figs. 1 and 2, with the main welding flame M directed against the puddle C, the auxiliary flame L directed against the rod R in spaced and generally upwardly diverging relation relative to the main welding flame to avoid interference with the latter, and the work preheating flames N, N and O, O directed against the opposite surfaces F, F of the V V, as the pipe W is rotated. Or the rod R and tip T are advanced a short distance and the pipe is turned, alternately, as the welding progresses, until the weld is completed. The disclosed efficient arrangement of the gas passages within the tip T was determined by careful experiment.

Because of the more effective application of heat, the tip of this invention increases the speed on rolling welds over that of the known three-flame tip for carburizing flame welding from 35 to 70 per cent, depending on the size of the pipe. As compared with single-flame welding, the speed of welding with the tip of this invention is more than doubled. For example, results from actual commercial welding indicate that, by virtue of the novel flame arrangement, the tip T averages somewhat less than five minutes per weld on 8 inch pipe with $\frac{1}{4}$ inch wall thickness, and about eight minutes per weld on 16 inch diameter pipe with a wall thickness of $\frac{1}{4}$ inch.

The following table I shows the remarkable results that have been accomplished by this invention; acetylene consumption being about 3 per cent more than oxygen.

Table I

| Pipe diameter | Wall thickness | Included angle of V | Rod per weld | Oxygen per weld | Time per weld |
|---|---|---|---|---|---|
| | Inch | Degrees | Pounds | Cubic feet | Minutes |
| 6 inches | 0.250 | 60 | 0.34 | 5¼ | 3½ |
| 6 inches | 0.312 | 60 | 0.50 | 6½ | 3¾ |
| 8 inches | 0.250 | 60 | 0.44 | 7 | 4 |
| 8 inches | 0.375 | 60 | 0.80 | 12¼ | 6 |
| 10 inches | 0.250 | 60 | 0.52 | 8 | 5¼ |
| 10 inches | 0.375 | 60 | 0.98 | 16½ | 8 |
| 12 inches | 0.250 | 60 | 0.65 | 9½ | 5½ |
| 12 inches | 0.375 | 60 | 1.08 | 20½ | 10 |
| 16 inches | 0.250 | 60 | 0.84 | 13 | 7¼ |
| 16 inches | 0.375 | 60 | 1.50 | 24½ | 12¾ |

In accordance with this invention, an included angle of 60° for the V V is preferred for all pipe thicknesses. However, where accurate spacing and line-up of the pipe parts are assured, a 50° included V angle is made possible, with a resultant increase in speed and a saving of 5 to 10 per cent in the consumption of rod and gases. Excellent results have been obtained by the invention in the use of a 50° V angle for pipe of heavier wall thicknesses, such as $\frac{7}{16}$ inch and $\frac{3}{8}$ inch.

A feature of importance in the present invention resides in the fact that, as the weld progresses, the welding rod R may be fed at a substantially constant rate into the puddle C, which is maintained in the welding state by the flame M, without any movement of the rod transversely of the V V, because the heating capacity of the auxiliary flame L is such that it heats the lower end portion 24 of the rod R rapidly and uniformly to at least a red heat before the weld metal enters the puddle. Further, the operator needs merely to tilt the tip T slightly as the weld progresses to insure proper sweating of the surfaces F, F and control of the welding puddle, as the pipe is rotated or as the tip T and rod R are advanced along the welding line.

In the past, rolling welds made with a three-flame tip have not been entirely satisfactory, due to the resulting type of reinforcement. Such welds tend to build up with sharp corners and concave centers. In all comparative welds with the multi-flame tip of this invention, however, this condition is entirely eliminated; the weld and base metals fusing perfectly and eliminating any tendency toward a sharp change in contour. The reinforcement increases evenly in the center line of the weld, resulting in an ideal cross-section. In all cases the appearance of the welds of this invention, indicate a noticeable improvement over three-flame rolling welds, the most advanced and rapid type of rolling welds prior to the present invention.

The tip of this invention also is designed to operate with standard blowpipes on either low or medium pressure acetylene with equally satisfactory results; and also to be interchangeable with the known three-flame tip, without difficulty by experienced operators; making it possible to carburizing flame weld pipe much faster and more economically, without sacrificing quality, than was possible before the invention. Further, the tip is light in weight and serviceable, although it discharges six flames simultaneously for manual welding; a decided improvement where the operator must support a blowpipe in one hand throughout the welding operation. This, together with the simplified rod feeding feature, permits the operator to give substantially his entire attention rapidly to completing each weld.

While the invention is particularly applicable to manual welding, it will be understood that it may be used in machine welding, if desired, the work being advanced under the tip at a uniform rate. The invention also is applicable to welding plate and work other than pipe in certain cases.

It has been proposed in the past to use a rod preheating flame in combination with a main welding flame, the rod preheating flame being discharged in converging relation with the main welding flame toward the molten body of weld metal in the welding zone. In such case, the rod preheating flame was directed so that it tended to interfere with the main welding flame and produce a non-uniform weld. On the other hand, in accordance with the present invention, the rod preheating flame is directed against the rod, not only in spaced relation to the welding zone, but in diverging relation with the main welding flame. This results in the production of a better and more economical and faster weld than that of the prior art.

What is claimed is:

1. A blowpipe tip for carburizing flame welding rotating ferrous metal parts arranged to form a circumferential welding groove, such as a V, said tip comprising a one-piece metal body having: a relatively short gas inlet chamber extending from the rear end of the tip; an elongated primary gas outlet passage extending from the bottom of said chamber to the front end face of the tip, and being adapted to discharge a main welding flame into said V and against a body of weld metal maintained thereby in a welding state; an elongated auxiliary gas outlet passage extending from the bottom of said chamber to said front end face, and adapted to discharge against a welding rod being fed into said body of weld metal a preheating flame at a place which is spaced on such rod a relatively short distance above said body of weld metal when the tip is in a normal operating position; the longitudinal axes of said chamber and passages being disposed in the central longitudinal-vertical plane of the tip with the axis of said primary gas outlet passage disposed in spaced parallel relation below the axis of said chamber and the axis of said auxiliary gas outlet passage so disposed above the axis of said chamber and in upwardly and forwardly inclined relation to the axis of said primary gas outlet passage, that the preheating flame is normally not discharged toward said body of weld metal; each of said gas outlet passages having a large inlet bore and a small outlet bore in axial alignment; secondary gas passages extending from the bottom of said chamber; and a plurality of gas outlet passages extending from said secondary gas passages to the bottom surface of the tip and being adapted to discharge spaced preheating flames against the V surfaces in advance of the welding operation.

2. A blowpipe tip for flame welding metal parts arranged to form a welding groove, such as a V, said tip comprising a one-piece metal body having: a relatively short gas inlet chamber extending from the rear end of the tip; an elongated primary gas outlet passage extending from the bottom of said chamber to the front end face of the tip, and being adapted to discharge a main welding flame into said V and against a body of weld metal maintained thereby in a welding state; an elongated auxiliary gas outlet passage extending from the bottom of said chamber to said front end face, and adapted to discharge against a welding rod being fed into said body of weld metal, a preheating flame at a place which is spaced on such rod a relatively short distance above said body of weld metal when the tip is in a normal operating position; the longitudinal axes of said chamber and passages being disposed in the central longitudinal-vertical plane of the tip with the axis of said primary gas outlet passage disposed in spaced parallel relation below the axis of said chamber and the axis of said auxiliary gas outlet passage so disposed above the axis of said chamber and in upwardly and forwardly inclined relation to the axis of said primary gas outlet passage that the preheating flame is normally not discharged toward said body of weld metal; each of said gas outlet passages having an inlet bore and an outlet bore of uniform diameter and in axial alignment; secondary gas passages extending from the bottom of said chamber; and a plurality of gas outlet passages extending from said secondary gas passages to the bottom surface of the tip and being adapted to discharge spaced preheating flames against the V surfaces in advance of the welding operation.

3. A blowpipe tip for flame welding metal parts arranged to form a welding groove, such as a V, said tip comprising a one-piece metal body having: a relatively short gas inlet chamber extending from the rear end of the tip; an elongated primary gas outlet passage extending from the bottom of said chamber to the front end face of the tip, and being adapted to discharge a main welding flame into said V and against a body of weld metal maintained thereby in a welding state; an elongated auxiliary gas outlet passage extending from the bottom of said chamber to said front end face, and adapted to discharge against a welding rod being fed into said body of weld metal, a preheating flame at a place which is spaced on such rod a relatively short distance above said body of weld metal when the tip is in a normal operating position; the longitudinal axes of said chamber and passages being disposed in the central longitudinal-vertical plane of the tip with the axis of said primary gas outlet passage disposed in spaced parallel relation below the axis of said chamber and the axis of said auxiliary gas outlet passage so disposed above the axis of said chamber and in upwardly and forwardly inclined relation to the axis of said primary gas outlet passage at a relatively small included angle that the preheating flame is normally not discharged toward said body of weld metal; secondary gas passages extending from the bottom of said chamber; and a plurality of gas outlet passages extending from said secondary gas passages to the bottom surface of the tip and being adapted to discharge spaced preheating flames against the V surfaces in advance of the welding operation.

4. A blowpipe tip for making rolling welds by carburizing flame welding of ferrous metal pipe parts arranged to form a circumferential welding groove, such as a V, said tip comprising a solid metal body having: a relatively short central cylindrical gas chamber extending from the rear end of the tip; an elongated primary gas outlet passage extending from the bottom of said chamber to a front end face of the tip and being adapted to discharge a main welding flame into said V and against a body of weld metal maintained in a welding state by said flame; the axis of said passage being substantially parallel to an axis of said chamber; an elongated auxiliary gas outlet passage extending from the bottom of said chamber to an end face of said tip and being adapted to discharge against a rod of weld metal being fed into said body of weld metal, a preheating flame at a place which is spaced on such rod a relatively short distance above said body of weld metal when the tip is in a normal operating position; the axes of said chamber and passages lying in a central plane extending longitudinally and vertically of the tip; the axes of said primary and auxiliary outlet passages so diverging that the preheating flame is normally not discharged toward said body of weld metal; a pair of parallel secondary gas passages extending from the bottom of said chamber in substantially equally spaced parallel relation to said central plane and terminating within the tip body in spaced relation to the end face of the tip; and two pairs of coplanar gas outlet passages extending from said secondary passages to a bottom face of the tip and being adapted to discharge spaced pairs of preheating flames against the included surfaces of the V.

5. A blowpipe tip for the flame welding of metal parts arranged to form a welding groove, such as a V, said tip comprising a metal body having: a gas inlet chamber extending from the rear end of the tip; an elongated primary gas outlet passage extending from the bottom of said chamber to a front end face of the tip and being adapted to discharge a main welding flame into said V and against a body of weld metal maintained in a welding state by said flame; the axis of said passage being substantially parallel to an axis of said chamber; an elongated auxiliary gas outlet passage extending from the bottom of said chamber to an end face of said tip and being adapted to discharge against a rod of weld metal being fed into said body of weld metal a preheating flame at a place which is spaced on such rod a relatively short distance above said body of weld metal when the tip is in a normal operating position; the axes of said chamber and passages lying in a central plane extending longitudinally and vertically of the tip; the axes of said primary and auxiliary outlet passages so diverging at a relatively included angle that the preheating flame is normally not discharged toward said body of weld metal; secondary gas passage means extending from the bottom of said chamber and terminating within the tip body in spaced relation to the end face of the tip; and a plurality of gas outlet passages extending from said secondary passage means to a bottom face of the tip and being adapted to discharge preheating flames against the inclined surfaces of the V.

6. A blowpipe tip for the flame welding of metal parts arranged to form a welding groove, such as a V, said tip comprising a metal body having: a relatively short central cylindrical gas inlet chamber extending from the rear end of the tip; an elongated primary gas outlet passage extending from the bottom of said chamber to a front end face of the tip and being adapted to discharge a main welding flame into said V and against a body of weld metal maintained in a welding state by said flame; the axis of said passage being substantially parallel to an axis of said chamber; an elongated auxiliary gas outlet passage extending from the bottom of said chamber to an end face of said tip and being adapted to discharge against a rod of weld metal being fed into said body of weld metal a preheating flame at a place which is spaced on such rod a relatively short distance above said body of weld metal when the tip is in a normal operating position; the axes of said chamber and passages lying in a central plane extending longitudinally and vertically of the tip; the axes of said primary and auxiliary outlet passages so diverging at a relatively small included angle that the preheating flame is normally not discharged toward said body of weld metal; a pair of parallel secondary gas passages extending from the bottom of said chamber in substantially equally spaced parallel relation to said central plane and terminating within the tip body in spaced relation to the end face of the tip; and two pairs of coplanar gas outlet passages extending from said secondary passages to a bottom face of the tip and being adapted to discharged spaced pairs of preheating flames against the inclined surfaces of the V; the planes of said pairs of coplanar gas outlet passages being inclined relatively to the axis of said primary gas outlet passage at different included angles.

7. A blowpipe tip for the flame welding of metal parts arranged to form a welding groove, such as a V, said tip comprising a metal body having: a gas inlet chamber extending from the rear end of the tip; primary gas outlet passage means extending from said chamber to the front end of the tip for discharging a main welding flame into said V and against a body of weld metal maintained in a welding state by said flame; auxiliary gas outlet passage means extending from said chamber to the front end of said tip for discharging, against a rod of weld metal being fed into said body of weld metal, a preheating flame in spaced and upwardly diverging relation relative to said main welding flame to avoid interference with the latter; and a plurality of gas outlet passage means extending from said chamber to a bottom face of the tip for discharging preheating flames against the inclined surfaces of the V.

MARVIN R. SCOTT.